(12) United States Patent
Channa

(10) Patent No.: US 10,359,981 B2
(45) Date of Patent: Jul. 23, 2019

(54) SYSTEM AND METHOD FOR COLLABORATIVE DEVICE DATA COLLECTION

(71) Applicants: Kabushiki Kaisha Toshiba, Minato-ku (JP); Toshiba TEC Kabushiki Kaisha, Shinagawa-ku (JP)

(72) Inventor: Jonathan A. Channa, Rancho Cucamonga, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 15/680,458

(22) Filed: Aug. 18, 2017

(65) Prior Publication Data

US 2019/0056900 A1 Feb. 21, 2019

(51) Int. Cl.
| | |
|---|---|
| G06F 3/12 | (2006.01) |
| H04L 12/26 | (2006.01) |
| H04L 29/08 | (2006.01) |
| H04N 1/00 | (2006.01) |
| H04L 12/24 | (2006.01) |

(52) U.S. Cl.
CPC ............ *G06F 3/1293* (2013.01); *G06F 3/121* (2013.01); *G06F 3/1235* (2013.01); *G06F 3/1286* (2013.01); *G06F 3/1287* (2013.01); *H04L 41/0213* (2013.01); *H04L 41/0853* (2013.01); *H04L 41/14* (2013.01); *H04L 43/065* (2013.01); *H04L 43/0817* (2013.01); *H04L 67/104* (2013.01); *H04L 67/148* (2013.01); *H04N 1/00042* (2013.01); *H04N 1/00079* (2013.01); *H04N 1/00244* (2013.01); *H04N 1/00344* (2013.01); *H04N 2201/0039* (2013.01); *H04N 2201/0041* (2013.01); *H04N 2201/0094* (2013.01)

(58) Field of Classification Search
CPC .... G06F 3/1293; G06F 3/1235; G06F 3/1286; G06F 3/121; G06F 3/1287; H04L 67/148; H04L 41/0213; H04L 43/065; H04L 43/0817; H04L 67/104; H04N 1/00244; H04N 1/00079; H04N 1/00344; H04N 1/00042; H04N 2201/0041; H04N 2201/009
See application file for complete search history.

(56) References Cited

U.S. PATENT DOCUMENTS

| | | | | |
|---|---|---|---|---|
| 2010/0103824 A1* | 4/2010 | Gilmour | ............... | H04L 41/046 370/245 |
| 2012/0266073 A1* | 10/2012 | Tanaka | ................ | G06F 11/3013 715/736 |

* cited by examiner

*Primary Examiner* — Kent Yip
(74) *Attorney, Agent, or Firm* — Ulmer & Berne LLP

(57) ABSTRACT

A system and method for multifunction peripheral data collection includes a network data connection with one or more multifunction peripherals and at least one peer data collector. A memory stores address data identifying each of a set of multifunction peripherals tasked for data collection. A processor initiates data transfer sessions in accordance with stored address data with each of the plurality of multifunction peripherals to retrieve device report data. Device report data from each successful data transfer session is retrieved and each device with an unsuccessful data transfer session is identified. A collection report is generated from retrieved device report data and this report is sent to an associated networked server. A generated problem list is sent to at least one other one networked device for further data collection and processing.

20 Claims, 4 Drawing Sheets

SYSTEM AND METHOD FOR COLLABORATIVE DEVICE DATA COLLECTION

TECHNICAL FIELD

This application relates generally to a system and method for collecting data from networked devices. The application relates more particularly to fault tolerant and balanced data collection from networked multifunction peripherals.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Given the expense in obtaining and maintain MFPs, devices are frequently shared or monitored by users or technicians via a data network. One company may have many MFPs for use by its employees. These MFPs may be located throughout a premises or distributed among multiple locations.

MFPs are complex devices that are prone to device failures. MFPs also rely on consumables, such as paper, ink, toner or staples which must periodically be replenished. Earlier on, an MFP user would monitor consumable levels on an individual machine and replenish as needed. In the event of a device error, such as a paper jam, users might be able to clear the problem themselves. In other situation, a malfunction would require that a call be placed to a service technician who would make a site visit to the affected MFP for repair. A technician might also make regular device visits to check for information such as copy count which might indicate a preset service interval or replacement of specified parts. In each instance noted above, considerable delay and expense is associated with monitoring and maintenance of MFPs.

SUMMARY

In accordance with an example embodiment of the subject application, a system and method for multifunction peripheral data collection includes a network data connection with one or more multifunction peripherals and at least one peer data collector. A memory stores address data identifying each of a set of multifunction peripherals tasked for data collection. A processor initiates data transfer sessions in accordance with stored address data with each of the plurality of multifunction peripherals to retrieve device report data. Device report data from each successful data transfer session is retrieved and each device with an unsuccessful data transfer session is identified. A collection report is generated from retrieved device report data and this report is sent to an associated networked server. A generated problem list is sent to at least one other one networked device for processing.

BRIEF DESCRIPTION OF THE DRAWINGS

Various embodiments will become better understood with regard to the following description, appended claims and accompanying drawings wherein:

DETAILED DESCRIPTION

Figure 1:
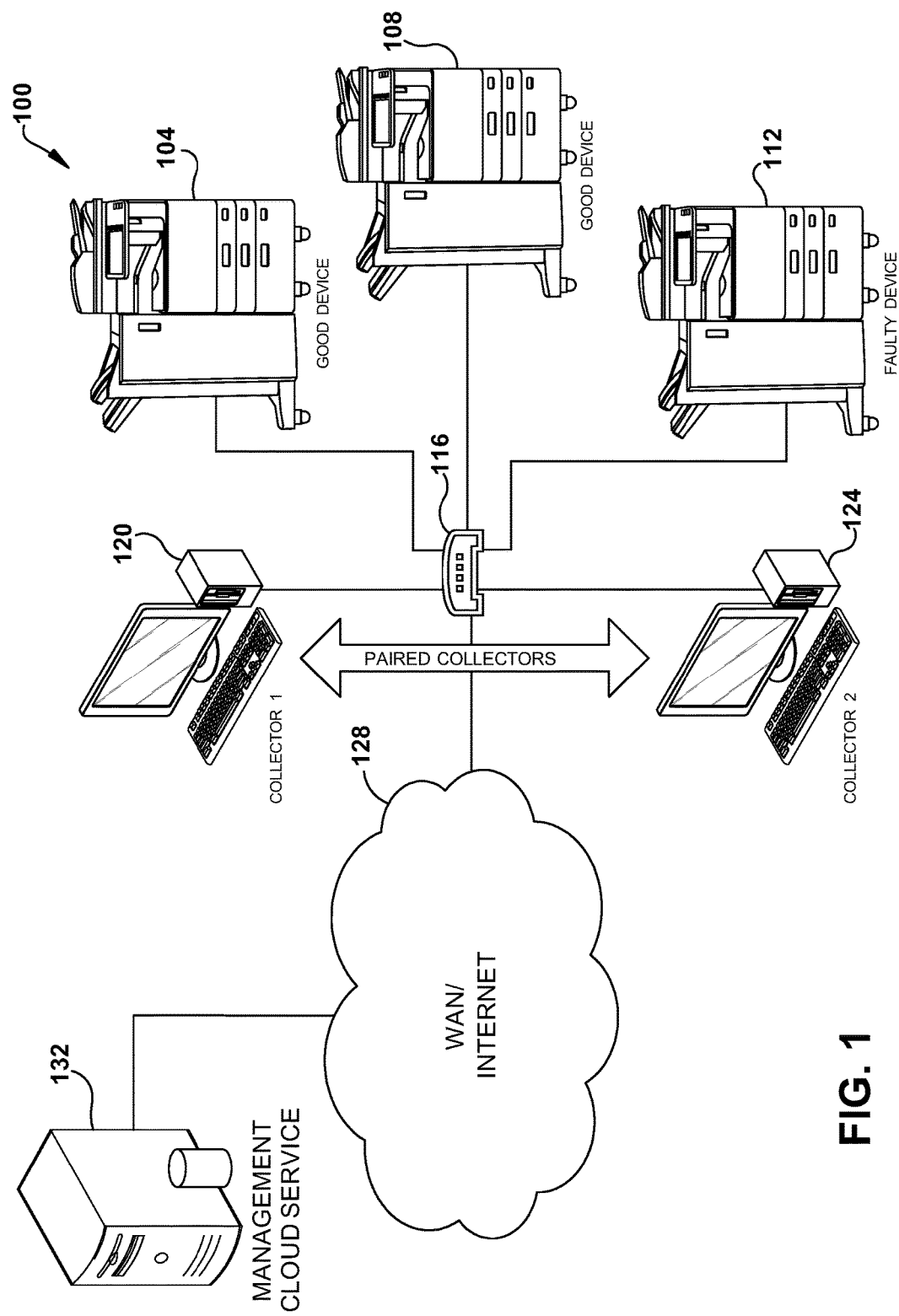
FIG. 1 an example embodiment of a device collector fault handling and balancing system.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

With networked MFP devices, such as those noted above, an improvement comprises use of networked monitoring of MFP devices. A technician could login to a device remotely and look for error codes, check consumable levels or review page count. While this is much more desirable that having a technician on site for device oversight, it could still take considerable time. In a further improvement, MFP devices could periodically generate standard reports and communicate them to a server. By way of example, a device might report its copy count or consumable levels to a server daily or weekly. This could be initiated by an MFP device as an information "push," or the MFP could respond to a server request as an information "pull."

Earlier on, MFP devices were purchased outright by end users. Users purchased and restocked consumables on their own. Users would maintain their devices as best they could, and schedule a technician visit when more difficult problems arose. More recently, businesses have migrated toward service agreements with third party providers. A user may have little or no up-front payment, and little or no recurring monthly charge. A user may not even have to purchase consumables, other than perhaps paper. Instead, the contracting service provider will attend to all such costs. Total cost to the end user can be fixed to machine usage, such as a fixed cost per page for printing or copying, perhaps with a monthly minimum page count. Such arrangements can be substantially beneficial to end users since it improves cash flow and eliminates support headaches. In certain professions, such as law practices, copy or printing costs may be captured and billed to their clients, absorbing much of the usage costs.

While service provider arrangements such as that described above can be extremely beneficial for end users, there is a substantial motivation for service providers to be as cost efficient as possible. Any savings in maintenance costs and human resource costs fall into profit relative to a fixed price per page. Accordingly, there is a substantial incentive to accurately monitor MFP device usage to capture costs, monitor device wear or schedule maintenance. It is advantageous to automate device monitoring as much as possible, such as by use of a device collector, suitably a computer that periodically collects information from a group of MFP devices.

Device collectors can occasionally encounter unforeseen failures. This can result from device errors or data communication errors. Additionally, companies may have MFP devices from different manufacturers, different device types from the same manufacturer, or different versions of devices or device software from the same manufacturer. Device data collection can be accomplished using a network management system. Simple Network Management Protocol (SNMP) is a popular protocol for network management. Alternatives include NetConf (Network Configuration Protocol) and YANG. SNMP is useful for collecting information from, and configuring, network devices, such as servers, printers, hubs, switches, and routers on an Internet Protocol (IP) network. Collection in SNMP can occur in connection with a device's management information base (MIB) which can refer to a complete collection of information available on a device. MIBs are addressed via object identifiers (OIDs) and particular device information can thus be collected. However, various MFP devices on a network may not conform to expected values or procedures leading to faulty, incomplete or failed collection. Other problems may include a collection timeout, bad MIB packages or randomly occurring or intermittent issues. When large or distributed networks including many different MFPs, device collection can be time consuming. Collection can be slowed by a collector with increased collection duties or collectors with more problematic devices to deal with.

In accordance with the subject application, FIG. 1 illustrates an example embodiment of a device collector fault handling and balancing system 100 including a plurality of MFPs, exemplified by MFPs 104, 108 and 112. The illustrated MFPs are part of a local area network (LAN 116) suitably defined by a hub/gateway. A pair of collectors 120 and 124 are in network data communication with the MFPs. Collectors 120, 124 are suitably assigned different subsets of devices for collection which may be distinct, overlapped or duplicated. Collector 120 is paired with collector 124 for collaborative collection, fault tolerance and load balancing as will be detailed further below. LAN 116 is connected to a wide area network (WAN 128) which may comprise the global Internet. WAN 128 forms a data connection with a management cloud service 132, such as may be associated with a device service provider as detailed above.

In the example embodiment of FIG. 1, MFPs 104 and 108 are defined as good devices, meaning that no problems currently exist relative to device data collection by an associated data collector. MFP 112 is a faulty device, such as one suffering from one or more of the device data collection problems discussed above.

Figure 2:
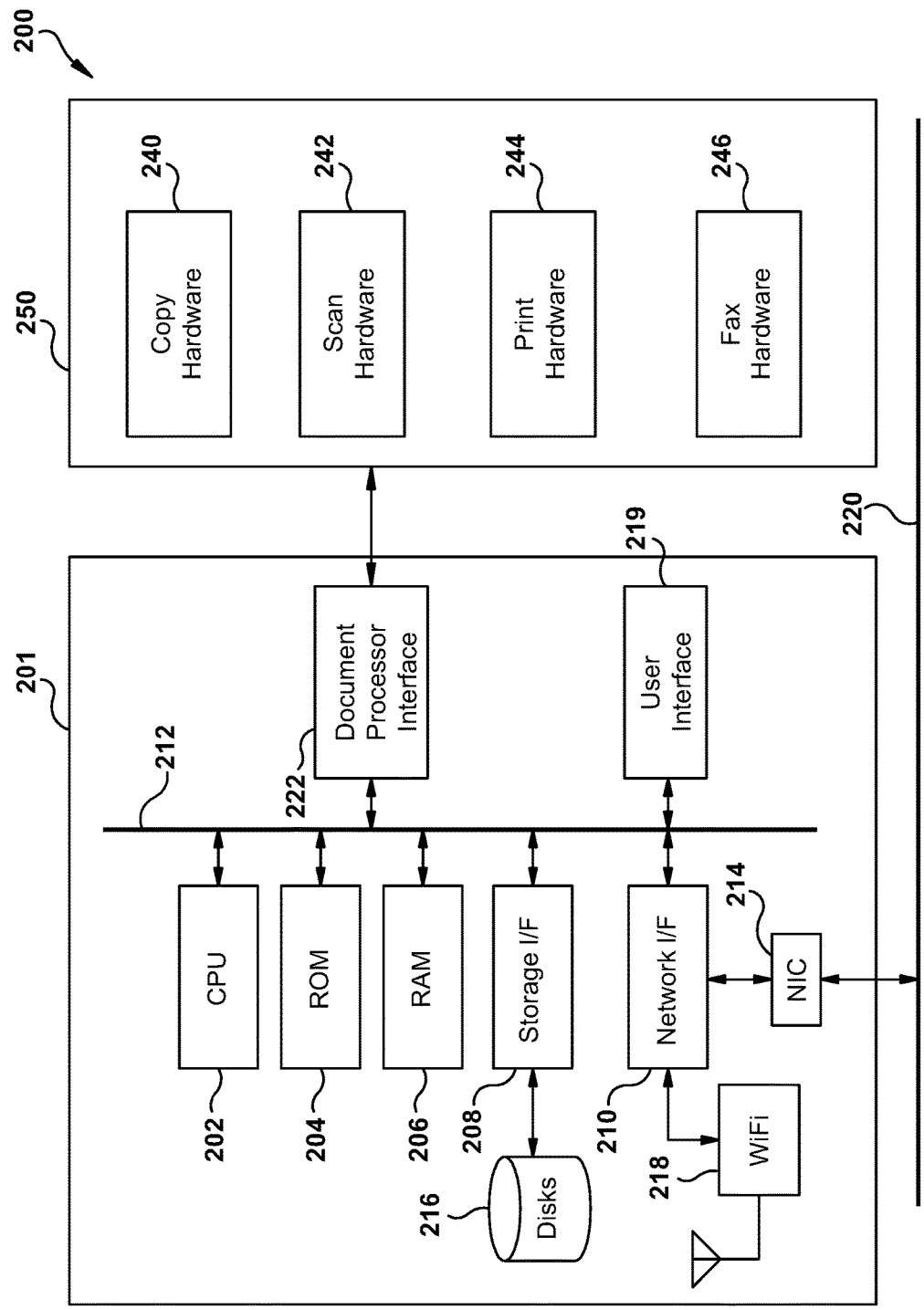
FIG. 2 is an example embodiment of functional device components suitably comprising a multifunctional peripheral.

Turning now to FIG. 2, illustrated are functional device components 200 suitably comprising a multifunctional peripheral such as MFPs 104, 108 and 112 of FIG. 1. Included is controller 201 comprised of one or more processors, such as that illustrated by processor 202. Each processor is suitably associated with non-volatile memory such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Apple Lightning, telephone line, or the like.

Processor 202 can also be in data communication with any suitable user input/output (I/O) interface 219 which provides data communication with user peripherals, such as displays, keyboards, mice, track balls, touch screens, or the like. Also in data communication with data bus 212 is a document processor interface 222 suitable for data communication with MFP functional units 250. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Hardware monitors suitably provide device event data, working in concert with suitable monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216.

Figure 3:
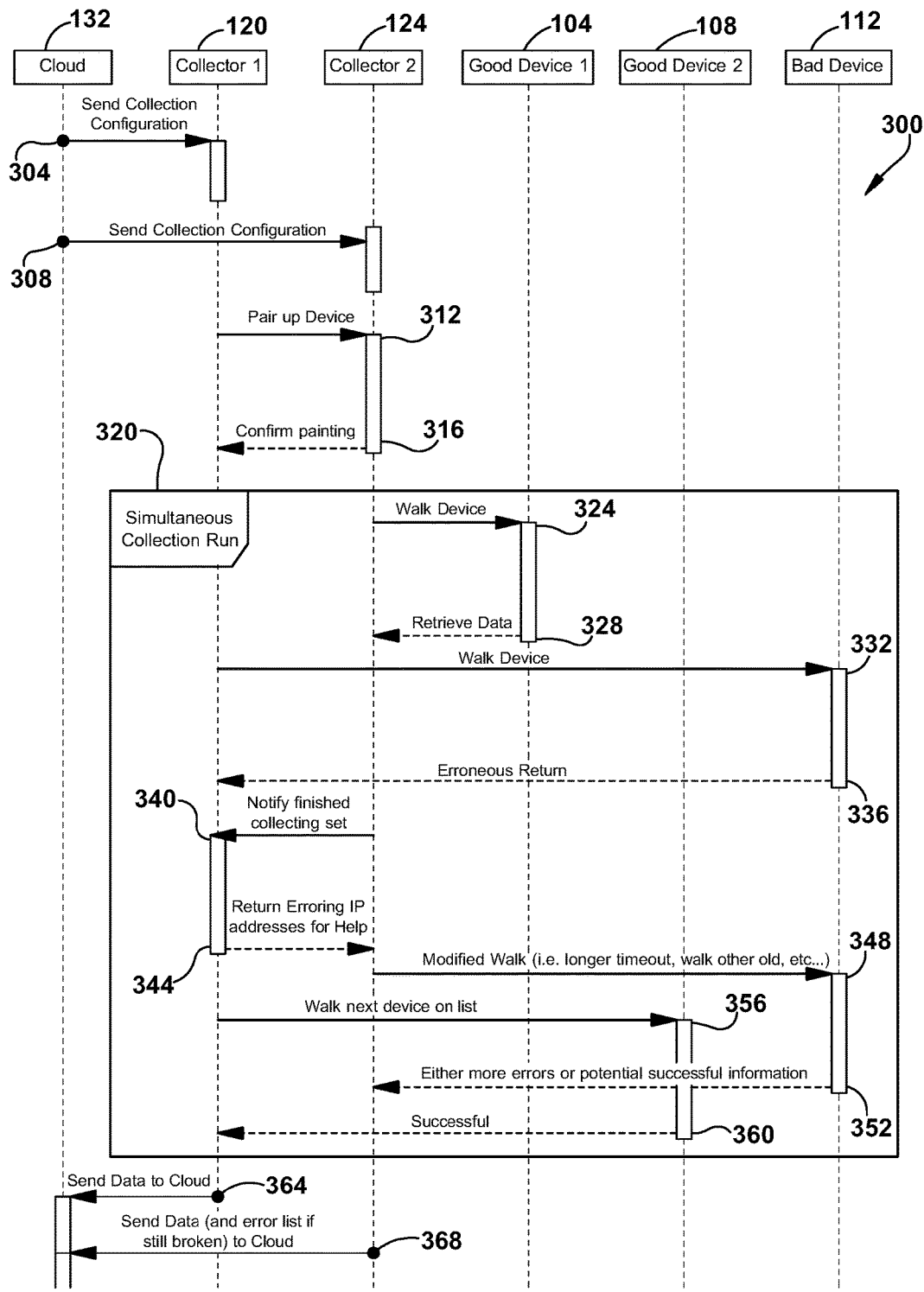
FIG. 3 is a flow diagram of an example embodiment of a data collection operation.

Referring next to FIG. 3, illustrated is an example flow diagram of a data collection operation performed when one or more collectors sequentially poll or walk to MFPs to which collection is tasked to them, such as with device collector fault handling and balancing system 100 of FIG. 1. Collection assignment duties are suitably set by an administrator via management cloud service 132. Cloud service 132 sends a collection configuration to collector 1 (collector 120 of FIG. 1) at 304 and a collection configuration to collector 2 (collector 124 of FIG. 1) at 308. Both collectors pair at 312, which pairing is confirmed at 316. Both paired devices simultaneously commence their programmed collection runs at 320.

A collection run 320 is comprised of connecting to each MFP tasked for collection. A successful collection operation comprises contacting an MFP at 324 and returning a data set at 328. An unsuccessful collection operation comprises contacting an MFP at 332 and determining an erroneous return at 336. Once all tasked devices have been contacted for collection, the paired device is notified at 340 and address information for erroneous collection devise exchanged and 344. Next, each collector device performs a modified walk of devices noted as problematic from its peer at 348. Modifications may include different collection procedures or longer timeout periods. Devices are screened for a potentially good collection results or confirmed with error conditions at 352. Potentially good machines for collection are polled at 356 and successful results exchanged with the peer device at 360. The collectors report their collection results to the cloud service at 364 and problematic devices for collection at 368.

Figure 4:
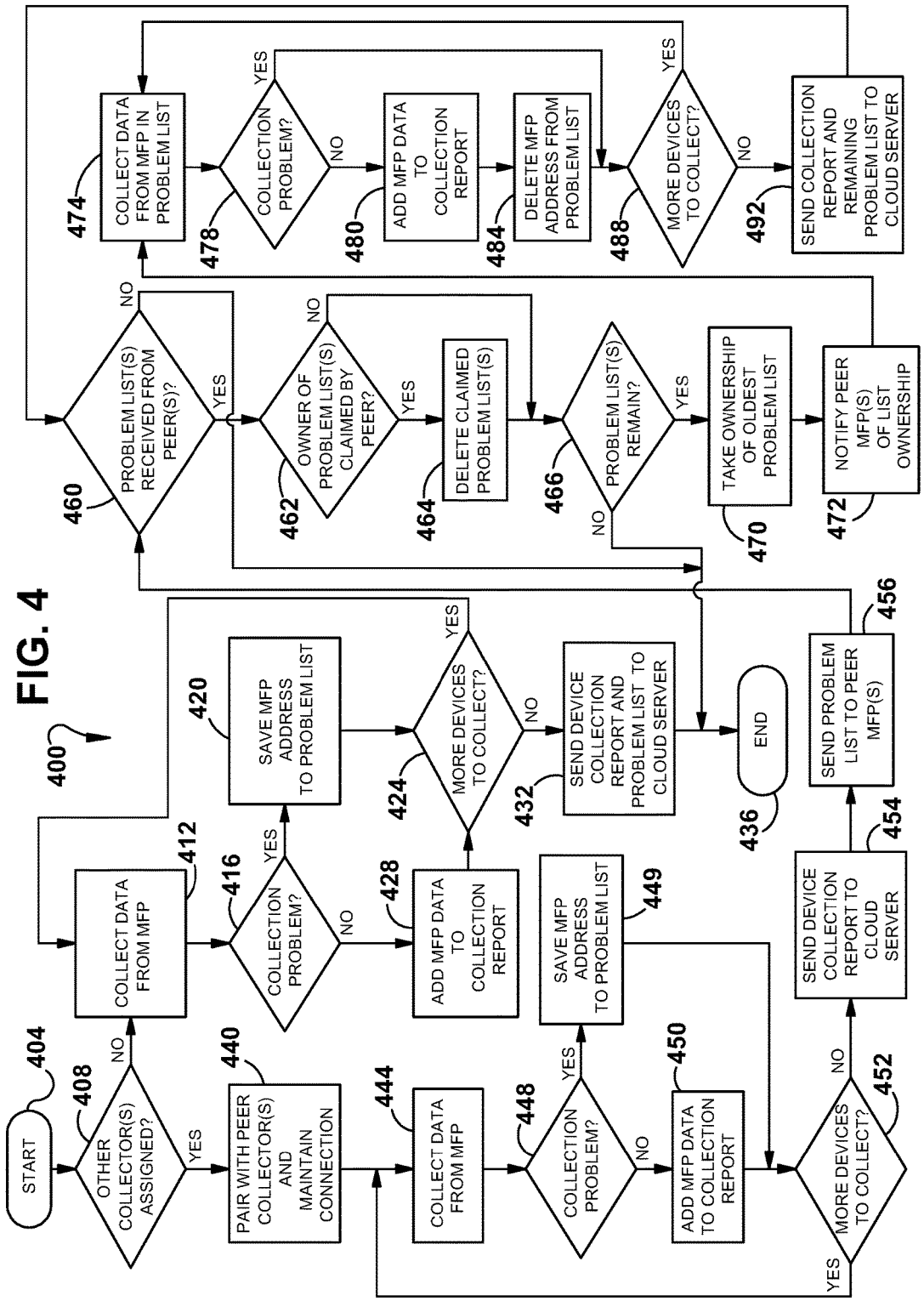
FIG. 4 is a flowchart of an example embodiment of a paired collector data collection system.

FIG. 4 is a flowchart 400 of operations of an example paired collector data collection system. The process commences at block 404 and a determination is made at block 408 as to whether one or more collectors are assigned to it for pairing, verification or balancing of collection operations. If no other collector is available or assigned, the collector commences walking through its collection devices and contacts a first device to collect data at block 412. If a collection problem is determined to exist at block 416, address information for the problematic device is stored at block 420 and a determination as to whether other devices remain for collection is made at block 424. If there is not a collection problem, MFP data is collected and added to a collection report at block 428, and a check for more devices is made at block 424. If more devices remain for collection, the process is returned to block 412 and a check of the next device is made. Once all devices have been checked, a device collection report and problem device list is sent to a cloud server at block 432, recalling that no peer device is present in this situation, and the process terminates at block 436.

If another collector is available as determined at block 408, such device is paired at block 440 and data is collected at block 444. If a collection problem is determined to exist at block 448, address information for the problematic device is stored at block 449 and a determination as to whether other devices remain for collection is made at block 452. If there is not a collection problem, MFP data is added to a collection report at block 450, and a check for more devices is made at block 452. If more devices remain for collection, the process is returned to block 444 and a check of the next device is made. Once all devices have been checked, a device collection report is sent to the cloud server at block 454 and the device problem list is sent to a paired collector at block 456. Next, the collector determines if one or more problem lists have been sent to it at block 460. If so, a check of whether another collector has undertaken the problem lists is made at block 462 and claimed problems lists are deleted at block 464. If no problem lists remain as determined at block 466, the process terminates at block 436. If one or more problem lists remain, the collector takes ownership of a list, suitably the oldest list, at block 470 and notifies its peer or peers of its ownership at block 472.

Next, the collector commences walking through its collection devices in the acquired problem list and contacts a first device at block 474. If a collection problem is determined to exist at block 478, address information for the problematic device is retained and a determination as to whether other devices remain for collection is made at block 488. If there is not a collection problem, MFP data is collected and added to a collection report at block 480, the MFP is deleted from the problem list at block 484, and a check for more devices is made at block 488. If more devices remain for collection, the process is returned to block 474 and a check of the next device is made. Once all devices have been checked, a device collection report and problem device list is sent to a cloud server at block 492, and the process returns to block 460 to address any remaining problem lists.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A multifunction peripheral data collector comprising:
   a network interface configured for data communication with a plurality of multifunction peripherals, the network interface further configured for data communication with at least one concurrently running peer data collector;
   a processor; and
   a memory in which address data for each of the plurality of multifunction peripherals is stored,
   wherein the processor is further configured to initiate a first data transfer walk comprised of a sequence of data transfer sessions, in accordance with the stored address data, with each of the plurality of multifunction peripherals to retrieve corresponding device report data,
   wherein the processor is further configured to retrieve device report data from each successful data transfer session,
   the memory storing a problem list corresponding to identities of multifunction peripherals associated with an unsuccessful data transfer session,
   wherein the processor is further configured to update the problem list corresponding to an identity of each multifunction peripheral associated with an unsuccessful data transfer session,
   wherein the processor is further configured to receive, while running the sequence of data transfer sessions, an incoming completion indicator from a peer data collector that it has completed a sequence of multifunction peripheral data transfer sessions assigned to it,
   wherein the processor is further configured to generate a collection report in accordance with the retrieved device report data, wherein the processor is further configured to output a generated collection report to an associated server via the network interface,
   wherein the processor further configured to communicate generated problem list data to the peer data collector via the network interface responsive to receipt of the indicator, and
   wherein the processor is further configured to continue running the sequence of data transfer sessions after communication of the problem list data to the peer data collector.

2. The data collector of claim 1 wherein the processor is further configured to communicate an outgoing transfer sessions.

3. The data collector of claim 2 wherein the processor is further configured to receive an incoming problem list, via the network interface, from the at least one peer data collector responsive to the outgoing completion indicator.

4. The data collector of claim 3 wherein the processor is further configured to initiate a second data transfer walk comprising sequence of data sessions with multifunction peripherals identified in the incoming problem list.

5. The data collector of claim 4
   wherein the processor is further configured to initiate each data session in the second data transfer walk in a unique way relative to data sessions of the first data transfer walk.

6. The data collector of claim 5 wherein the processor is further configured to communicate a problem list corresponding to identities of multifunction peripherals associated with an unsuccessful second data transfer session to at least one networked server.

7. The data collector of claim 1 wherein the processor is further configured to pair with the peer data collector.

8. The data collector of claim 7 wherein the processor is further configured to load balance retrieval of device report data and peer device report data with a paired peer data collector.

9. A method for multifunction peripheral data collection comprising:
communication data with a plurality of multifunction peripherals via a network interface;
communicating data with at least one concurrently running peer data collector via the network interface;
storing identity data and associated address data for each of the plurality of multifunction peripherals in a memory;
initiating a first data transfer walk comprised of a sequence of data transfer sessions in accordance with the associated stored address data with each of the plurality of multifunction peripherals to corresponding retrieve device report data;
retrieving device report data from each successful data transfer session;
storing problem list data corresponding to identities of multifunction peripherals associated with an unsuccessful data transfer session;
generating problem list data corresponding to an identity of each multifunction peripheral associated with an unsuccessful data transfer session;
receiving, while running the sequence of data transfer sessions, an incoming completion indicator from a peer data collector that it has completed a sequence of data transfer sessions assigned to it,
generating a collection report in accordance retrieved device report data;
outputting a generated collection report to an associated server via the network interface;
communicating generated problem list data to the peer data collector via the network interface; and
continuing the sequence of data transfer sessions after communication of the problem list data to the peer data collector.

10. The method of claim 9 further comprising communicating an outgoing completion indicator to the peer data collector upon completion of the sequence of data transfer sessions.

11. The method of claim 10 further comprising receiving an incoming problem list via the network interface, from the at least one peer data collector responsive to the outgoing completion indicator.

12. The method of claim 11 further comprising initiating a second data transfer walk comprising sequence of data sessions with multifunction peripherals identified in the incoming problem list.

13. The method of claim 12 further comprising:
initiating each data session in the second data transfer walk in a unique way relative to data sessions of the first data transfer walk.

14. The method of claim 13 further comprising communicating a problem list corresponding to identities of multifunction peripherals associated with an unsuccessful second data transfer session to server.

15. The method of claim 9 further comprising pairing with the peer data collector.

16. The method of claim 15 further comprising load balancing the retrieval of device report data and peer device report data with the paired peer data collector.

17. A device data collector for multifunction peripherals comprising:
a network interface;
a processor configured for data communication with a second device data collector via the network interface,
the processor further configured to pair with the second device data collector via the network interface; and
a memory configured to store device list data comprising address data for each of a plurality of monitored multifunction peripherals,
wherein the processor is further configured to initiate a sequence of SNMP data exchanges with each of the plurality of monitored multifunction peripherals concurrently with the second device data collector,
wherein the processor is further configured to retrieve device report data for each successful SNMP data exchange,
wherein the processor is further configured to generate a problem list identifying each multifunction peripheral associated with an unsuccessful SNMP data exchange,
wherein the processor is further configured to receive, while running the sequence SNMP data exchanges, an incoming completion indicator from the second data collector that it has completed a sequence of data exchanges assigned to it,
wherein the processor is further configured to communicate a generated problem list to the paired second device data collector responsive to a received incoming completion indicator, and
wherein the processor is further configured to communicate the report data to an associated cloud server via the network interface.

18. The device data collector of claim 17
wherein the processor is further configured to communicate an outgoing completion indicator to the paired second device upon completion of the sequence of SNMP data exchanges,
wherein the processor is further configured to receive an incoming problem list from the paired second device data collector responsive to the outgoing completion indicator, the incoming problem list including address data for at least one problematic multifunction peripheral and incoming process data corresponding to a collection process associated with identification of the at least one problematic multifunction peripheral,
wherein the processor is further configured to initiate an alternative data exchange process to the SNMP data exchange sequence with each of problematic multifunction peripherals identified in the incoming problem list with a distinct collection process relative to the incoming process data,
wherein the processor is further configured to retrieve device report data for each successful alternative data exchange with a multifunction peripheral identified in the incoming problem list,
wherein the processor is further configured to remove from the problem list each multifunction peripheral for which an SNMP data exchange is successful, and
wherein the processor is further configured to communicate at least one of the problem list and the report data to at least one associated networked data device via the network interface.

19. The device data collector of claim 18 wherein the at least one associated networked data device comprises the paired second device data collector.

20. The device data collector of claim 18 wherein the at least one associated networked data device comprises the cloud server device.

* * * * *